United States Patent
Yamamoto et al.

(10) Patent No.: US 7,972,729 B2
(45) Date of Patent: Jul. 5, 2011

(54) POSITIVE ELECTRODE MATERIAL FOR NON-AQUEOUS ELECTROLYTE SECONDARY BATTERY, NON-AQUEOUS ELECTROLYTE SECONDARY BATTERY USING THE SAME, AND METHOD FOR PRODUCING POSITIVE ELECTRODE MATERIAL FOR NON-AQUEOUS ELECTROLYTE SECONDARY BATTERY

(75) Inventors: Teruaki Yamamoto, Osaka (JP); Shinichi Waki, Osaka (JP); Yasuhiko Bito, Osaka (JP)

(73) Assignee: Panasonic Corporation, Osaka (JP)

( * ) Notice: Subject to any disclaimer, the term of this patent is extended or adjusted under 35 U.S.C. 154(b) by 230 days.

(21) Appl. No.: 12/170,177

(22) Filed: Jul. 9, 2008

(65) Prior Publication Data

US 2009/0017382 A1    Jan. 15, 2009

(30) Foreign Application Priority Data

Jul. 10, 2007  (JP) ................................. 2007-181194

(51) Int. Cl.
- *H01M 4/00* (2006.01)
- *H01M 4/50* (2006.01)
- *H01M 4/58* (2006.01)

(52) U.S. Cl. ............... 429/224; 429/218.1; 429/220; 429/223; 429/231.9; 429/231.95

(58) Field of Classification Search ............... 429/224
See application file for complete search history.

(56) References Cited

U.S. PATENT DOCUMENTS

| | | | | |
|---|---|---|---|---|
| 6,344,294 | B1 * | 2/2002 | Torata et al. | 429/223 |
| 2001/0031397 | A1 * | 10/2001 | Kweon et al. | 429/218.1 |
| 2007/0082266 | A1 * | 4/2007 | Waki et al. | 429/224 |

FOREIGN PATENT DOCUMENTS

| | | |
|---|---|---|
| JP | 10-172571 | 6/1998 |
| JP | 11-071115 | 3/1999 |

* cited by examiner

*Primary Examiner* — Basia Ridley
*Assistant Examiner* — Sean P Cullen
(74) *Attorney, Agent, or Firm* — McDermott Will & Emery LLP

(57) ABSTRACT

The invention includes, as a positive electrode material, active material particles comprising a lithium-containing manganese oxide represented by the general formula: $Li_{1+a}Mn_{2-x-a}M_xO_{4+y}$ where M is a transition metal element other than Mn, $0<x\leq0.5$, $-0.2\leq y\leq0.5$, and $0\leq a\leq0.33$. The molar ratio A of M to the total of Mn and M in the surface of the active material particles and the molar ratio B of M to the total of Mn and M in the whole active material particles satisfy the relations: $A/B>1.0$ and $A\geq0.3$. In an X-ray diffraction analysis using $CuK\alpha$ radiation as an X-ray source, the intensity ratio of the largest peak of peaks attributed to an oxide of the transition metal element M to a peak around $2\theta=36.4°$ is 0.25 or less.

4 Claims, 1 Drawing Sheet

POSITIVE ELECTRODE MATERIAL FOR NON-AQUEOUS ELECTROLYTE SECONDARY BATTERY, NON-AQUEOUS ELECTROLYTE SECONDARY BATTERY USING THE SAME, AND METHOD FOR PRODUCING POSITIVE ELECTRODE MATERIAL FOR NON-AQUEOUS ELECTROLYTE SECONDARY BATTERY

FIELD OF THE INVENTION

The invention relates to a positive electrode material for a non-aqueous electrolyte secondary battery, a non-aqueous electrolyte secondary battery using the same, and a method for producing a positive electrode material for a non-aqueous electrolyte secondary battery.

BACKGROUND OF THE INVENTION

Lithium secondary batteries, which have high electromotive force and high energy density, have been used as the main power source for electronics such as mobile communications devices and portable devices and as the power source for memory back-up. The demand for lithium secondary batteries is increasing year after year. As electronic devices are becoming smaller, more sophisticated, and maintenance-free, non-aqueous electrolyte secondary batteries are required to provide higher capacities and improved storage characteristics. Also, clock back-up power sources for digital still cameras, etc. are particularly required to have improved storage characteristics under high temperature environments since they may be exposed to high temperatures during the operation of devices.

Lithium-containing manganese oxides are widely used as positive electrode materials, but they have a problem in that dissolution of manganese therefrom during storage at high temperatures causes the battery performance to degrade. To suppress the dissolution of Mn during storage at high temperatures, for example, Japanese Laid-Open Patent Publication No. Hei 11-071115 proposes replacing a part of Mn contained in a lithium-containing manganese oxide with another transition metal element M such as Ni or Fe. Also, for example, Japanese Laid-Open Patent Publication No. Hei 10-172571 proposes positive electrode active material particles comprising a lithium-containing manganese oxide in which a part of Mn is replaced with another transition metal element M such as Ni or Fe. The proposed active material particles have a two-layer structure composed of a central layer and a surface layer, and the central layer and the surface layer have different Mn valences.

However, when a positive electrode material described in Japanese Laid-Open Patent Publication No. Hei 11-071115 or No. Hei 10-172571 is used, the capacity may decrease. That is, when a part of Mn contained in a lithium-containing manganese oxide is replaced with a transition metal element M, the practical battery capacity may decrease due to a change in the relation between the positive electrode potential and the capacity. This is probably because the potential at which the valence of the transition metal element M changes is different from that for manganese. Also, when the amount of the transition metal element M is reduced to avoid the capacity decrease, the dissolution of Mn cannot be sufficiently suppressed.

In order to solve the above-discussed problems associated with conventional techniques, it is therefore an object of the invention to provide a Mn-containing positive electrode material for a non-aqueous electrolyte secondary battery in which the dissolution of Mn during storage at high temperatures is suppressed without lowering the positive electrode capacity. Another object of the invention is to provide a high capacity battery with excellent high temperature storage characteristics by using the positive electrode material. Still another object of the invention is to provide an easy method for producing the positive electrode material for a non-aqueous electrolyte secondary battery.

BRIEF SUMMARY OF THE INVENTION

To achieve the above objects, a positive electrode material for a non-aqueous electrolyte secondary battery of the invention includes active material particles comprising a lithium-containing manganese oxide, and a layer with a high molar ratio of a transition metal element M (e.g., Fe, Ni, or Ti, but Mn is excluded) is disposed on the surface of the active material particles while the production of an oxide of the transition metal element M is suppressed.

That is, a positive electrode material for a non-aqueous electrolyte secondary battery according to the invention includes active material particles comprising a lithium-containing manganese oxide represented by the general formula: $Li_{1+a}Mn_{2-x-a}M_xO_{4+y}$, where M is a transition metal element other than Mn, $0<x\leq0.5$, $-0.2\leq y\leq0.5$, and $0\leq a\leq0.33$. The molar ratio A of M to the total of Mn and M in the surface of the active material particles and the molar ratio B of M to the total of Mn and M in the whole active material particles satisfy the relations: $A/B\geq1.0$ and $A\geq0.3$. In an X-ray diffraction analysis using CuKa radiation as an X-ray source, the intensity ratio of the largest peak of peaks attributed to an oxide of the transition metal element M to a peak around $2\theta=36.4°$ is 0.25 or less.

The transition metal element M is preferably at least one selected from the group consisting of Ni, Fe, Ti, Zr, and Cu.

The invention also relates to a non-aqueous electrolyte secondary battery including the above-described positive electrode material.

The invention further pertains to a method for producing a positive electrode material for a non-aqueous electrolyte secondary battery. This method includes: (1) the first step of mixing a manganese oxide, a lithium-containing raw material, and a raw material containing a transition metal element M other than Mn in a molar ratio of Li:Mn:M=1+a:2−x−a:x to obtain a mixture; and (2) the second step of baking the mixture at a temperature of 250° C. or more and 600° C. or less.

It is preferable that in the first step, a=0, and that in the second step, the mixture is baked in air.

The lithium-containing raw material is preferably lithium acetate.

The raw material containing the transition metal element M is preferably an acetate of the transition metal element M.

It is preferable that the lithium-containing raw material be an aqueous solution containing lithium acetate, and that the first step further include the step of drying the mixture.

It is preferable that the raw material containing the transition metal element M be an aqueous solution containing an acetate of the transition metal element M, and that the first step further include the step of drying the mixture.

The baking temperature is preferably 300° C. or more and 550° C. or less.

The invention can provide a Mn-containing positive electrode material for a non-aqueous electrolyte secondary battery in which the dissolution of Mn during storage at high temperatures is suppressed without lowering the positive electrode capacity. The use of the positive electrode material yields a high capacity battery with excellent high temperature storage characteristics. Further, the invention can provide an easy method for producing the positive electrode material for a non-aqueous electrolyte secondary battery.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
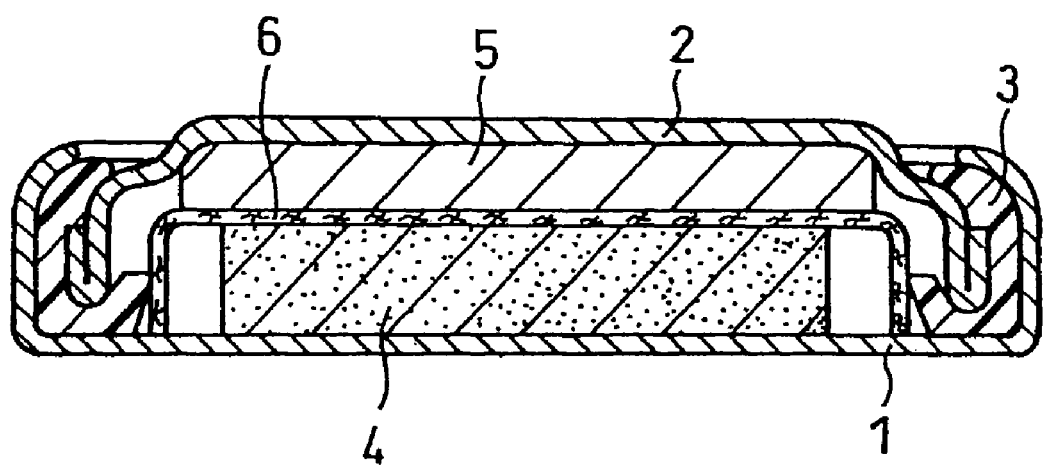
FIG. 1 is a sectional view of a coin-type non-aqueous electrolyte secondary battery in an Example of the invention.

The inventors have diligently examined positive electrode materials for non-aqueous electrolyte secondary batteries. As a result, they have found that by heightening the molar ratio of a transition metal element M in the surface of active material particles comprising a lithium-containing manganese oxide, and making the molar ratio of the transition metal element M in the whole active material particles lower than the molar ratio of the transition metal element M in the surface, both high capacity and suppression of dissolution of Mn can be achieved.

Specifically, using positive electrode materials including active material particles comprising a lithium-containing manganese oxide represented by the general formula: $Li_{1+a}Mn_{2-x-a}M_xO_{4+y}$, where M is a transition metal element other than Mn, $0<x\leq0.5$, $-0.2\leq y\leq0.5$, and $0\leq a\leq0.33$, the inventors have examined the molar ratio (=M/(Mn+M)) of M to the total of Mn and M in the active material particles. They have found that both high capacity and suppression of dissolution of Mn during storage at high temperatures can be achieved under the following conditions:

(a) the molar ratio of M to the total of Mn and M in the surface of the active material particles (hereinafter referred to as the molar ratio A) and the molar ratio of M to the total of Mn and M in the whole active material particles (hereinafter referred to as the molar ratio B) satisfy the relations: A/B>1.0 and A≧0.3; and (b) in an X-ray diffraction analysis using CuKa radiation as an X-ray source, the intensity ratio of the largest peak of peaks attributed to an oxide of the transition metal element M to a peak around 2θ=36.4° is 0.25 or less.

The molar ratio A can be determined, for example, from the measurement result of active material particles which were etched 1 nm ($SiO_2$ conversion) by X-ray photoelectron spectroscopy (hereinafter "XPS"). The molar ratio B can be determined, for example, from the measurement result by high frequency inductively coupled plasma (hereinafter "ICP") emission spectroscopy.

The active material particles have a surface layer in which the molar ratio of the transition metal element M to Mn is high. The thickness of the surface layer of the active material particles corresponds to the depth from the outermost surface in which the molar ratio of M to Mn based on the signal intensity of M to Mn determined by XPS satisfies (molar ratio B+molar ratio C)/2 where the molar ratio C represents the molar ratio of M to Mn based on the signal intensity ratio of M to Mn in the outermost surface of the active material particles determined by XPS.

The thickness of the surface layer of the active material particles is preferably 1 nm or more. If the thickness of the surface layer is less than 1 nm, the dissolution of Mn cannot be sufficiently suppressed. That is, the molar ratio A determined by XPS after etching 1 nm ($SiO_2$ conversion) should be 0.3 or more. The molar ratio A is preferably 0.35 or more.

The molar ratio B determined by ICP emission spectroscopy is preferably 0.3 or less, and more preferably 0.22 or less. In view of the voltage range in battery operation, if a part of Mn is replaced with M, the substantially usable capacity increases, but if the molar ratio B exceeds 0.3, the capacity decreases.

The molar ratios A and B preferably satisfy A/B≧1.5.

The particle size of the active material particles in the invention is preferably 0.1 to 100 μm, and more preferably 1 to 50 μm. If the particle size of the active material particles is less than 0.1 μm, the ratio of the surface layer to the whole particles is high. It is thus difficult to achieve both high capacity and suppression of dissolution of Mn even if the baking temperature or time is adjusted. Also, due to an increase in the amounts of a conductive material and a binder optionally added to a positive electrode mixture that is described below, the capacity of the positive electrode mixture decreases, which may result in degradation of cycle life characteristics. If the particle size of the active material particles exceeds 100 μm, the speed of charge/discharge reaction becomes low, so that the substantially usable capacity decreases.

The use of a lithium-containing manganese oxide represented by $Li_{1+a}Mn_{2-x-a}M_xO_{4+y}$, where M is a transition metal element other than Mn, $0<x\leq0.5$, $-0.2\leq y\leq0.5$, and $0\leq a\leq0.33$ as the positive electrode active material allows an improvement in capacity and cycle life characteristics. It should be noted, however, that this composition is before charge (during discharge), and the composition ratio of lithium changes due to charge/discharge.

The value x represents the amount of the element M. If the value x exceeds 0.5, the capacity density of the positive electrode active material becomes insufficient. The value x is preferably 0.17 to 0.4 since the best balance can be obtained between cycle life characteristics and capacity density. If the value x is less than 0.17, the discharge capacity may decrease if charge/discharge is repeated at a closed circuit voltage of approximately 3 V.

The value y represents a variation in the amount of oxygen. In order for the value y to exceed 0.5, the valence or Mn or the additional element needs to be 4 or more, and it is thus difficult to synthesize a lithium-containing manganese oxide. The preferable range is $0<y\leq0.5$ in terms of making the manganese oxide cation-deficient and suppressing Jahn-Teller distortion.

The value a represents the amount of lithium substituted for Mn. If the value a exceeds 0.33, the discharge capacity decreases. It should be noted that in the case that a<0, Mn or element M is usually disposed at the 8a site that Li contributing to charge/discharge reaction occupies, so that the discharge capacity lowers. The preferable value a is 0.05 to 0.15.

The transition metal element M is not particularly limited. It is preferably an element whose ion radius is close to that of Mn, or an element contributing to oxidation-reduction reaction (positive electrode capacity). For example, Ni, Fe, Ti, Zr, or Cr can be used as the transition metal element M. Among them, Ni, Fe, and Ti are particularly preferable. When the transition metal element M is at least one selected from the group consisting of Ni, Fe, and Ti, the cycle life characteristics significantly improve and the capacity significantly increases.

In an X-ray diffraction analysis using CuKa radiation as the X-ray source, the intensity ratio of the largest peak (e.g., in the case of NiO, around 2θ=37.3°) of peaks attributed to an oxide of the transition metal element M to a peak around $2\theta=36.4°$ attributed to a lithium-containing manganese oxide is 0.25 or less. If the intensity ratio exceeds 0.25, the surface layer of the active material particles is not evenly formed, so that the storage characteristics cannot be sufficiently improved.

A method for producing a positive electrode material for a non-aqueous electrolyte secondary battery according to the invention includes: (1) the first step of mixing a manganese oxide, a lithium-containing raw material, and a raw material containing a transition metal element M other than Mn in a molar ratio of Li:Mn:M=1+a:2−x−a:x where $0<x\leqq0.5$ and $0\leqq a\leqq0.33$ to obtain a mixture; and (2) the second step of baking the mixture at a temperature of 250° C. or more and 600° C. or less.

It is preferable that in the first step, a=0, and that in the second step, the mixture be baked in an atmosphere containing oxygen (e.g., in air). This ensures that the composition ratio y of oxygen in the lithium-containing manganese oxide is controlled in the range of −0.2 to 0.5.

The manganese oxide can be, for example, electrolytic manganese dioxide.

The lithium-containing raw material can be, for example, lithium acetate, lithium hydroxide, or lithium carbonate. Among them, lithium acetate is preferred since its melting point, decomposition temperature, and ignition temperature are low.

Also, the lithium-containing raw material can be an aqueous solution containing a water-soluble material such as lithium acetate or lithium hydroxide. In the case of using such an aqueous solution, it is preferable that the first step further include the step of drying the mixture.

The raw material containing the transition metal element M can be, for example, an oxide, a hydroxide, a nitrate, a carbonate, a sulfate, or an acetate. Among them, an acetate of the transition metal element M is preferable since its melting point, decomposition temperature, and ignition temperature are low.

Also, the raw material containing the transition metal element M can be an aqueous solution containing a water-soluble material such as an acetate or hydroxide of the transition metal element M. In the case of using such an aqueous solution, it is preferable that the first step further include the step of drying the mixture.

It is more preferable to dry the mixture and thereafter grind and mix it to such an extent that it does not separate.

Also, the mixture can be obtained by spraying drying. For example, a suspension prepared by adding Mn oxide powder to an aqueous solution of a raw material containing the transition metal element M and Li is dried while spraying, in order to obtain a mixture composed of the Mn oxide powder coated with the raw material containing M and Li.

In the second step, the baking temperature of the mixture is 250° C. or more and 600° C. or less. If the baking temperature exceeds 600° C., the transition metal element M in the surface of the active material particles diffuses inwardly due to heat. It is thus difficult to provide a composition and structure enabling both high capacity and suppression of dissolution of Mn. If the baking temperature is less than 250° C., the baking becomes insufficient, so that the portion of the active material not contributing to reversible reaction increases. Thus, the capacity in a higher potential range than charge voltage increases, which may result in a decrease in battery capacity. Preferably, the baking temperature of the mixture in the second step is 300° C. or more and 550° C. or less. The baking time in the second step is, for example, 5 to 24 hours.

In the above production method, the mixture is baked at a relatively low temperature with the materials that decompose at or below the baking temperature (the Li-containing raw material and the raw material containing the transition metal element M) being evenly disposed on the surface of the manganese oxide. It is thus possible to suppress the inward diffusion of the transition metal element M and form a layer with a high molar ratio of the transition metal element M on the surface of the active material particles. It is also possible to suppress the production of an oxide of the transition metal element M on the surface of the active material particles.

The non-aqueous electrolyte secondary battery of the invention includes, for example, a positive electrode including the above-described positive electrode active material, a negative electrode including a negative electrode active material, and a lithium-ion conductive non-aqueous electrolyte. The shape of the non-aqueous electrolyte secondary battery of the invention is not particularly limited. For example, the invention is applicable to batteries of coin, cylindrical, prismatic, or sheet-type.

The positive electrode for a coin-type battery can be obtained, for example, by shaping a positive electrode mixture into pellet form. The positive electrode mixture contains, for example, the positive electrode active material, a conductive material, and a binder. The positive electrode for a cylindrical battery or prismatic battery can be obtained, for example, by applying a positive electrode paste prepared by dispersing the positive electrode mixture in liquid onto both faces of a positive electrode current collector, drying it, and rolling it to form positive electrode mixture layer on both faces of the positive electrode current collector.

Also, the potential of the positive electrode is preferably 1.8 V or more, and more preferably 2.0 V or more, verses lithium even upon deep discharge, i.e., when the battery voltage is 0 V. If the potential of the positive electrode is less than 1.8 V, it is difficult to maintain the crystal structure of the lithium-containing manganese oxide, thereby resulting in insufficient reversible reaction.

The negative electrode for a coin battery can be prepared by punching out lithium metal or lithium alloy into pellet form. Also, in order to obtain good cycle characteristics, it is preferable to use a palletized negative electrode mixture as the negative electrode. The negative electrode mixture contains, for example, a negative electrode active material, a binder, a conductive material, and a thickener. In the case of a cylindrical battery or prismatic battery, the negative electrode can be obtained, for example, by applying a negative electrode paste prepared by dispersing the negative electrode mixture in liquid onto both faces of a negative electrode current collector, drying it, and rolling it to form negative electrode mixture layer on both faces of the negative electrode current collector.

The negative electrode active material is not particularly limited, and preferably is a carbon material or a silicon material. Examples of carbon materials include graphite, graphitizable carbon materials, and non-graphitizable carbon materials. Examples of silicon materials include silicon (simple substance), silicon oxides, silicon carbides, silicon nitrides, and silicon alloys. Among them, in terms of capacity and cycle life, silicon alloys containing a transition metal element are more preferable.

The non-aqueous electrolyte comprises, for example, a non-aqueous solvent and a lithium salt dissolved therein. Examples of non-aqueous solvents include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; γ-lactones such as γ-butyrolactone; chain ethers such as 1,2-dimethoxyethane (DME), 1,2-diethoxyethane (DEE), and ethoxymethoxyethane (EME); and cyclic ethers such as tetrahydrofuran and 2-methyltetrahydrofuran. They can be used singly or in combination of two or more of them.

Examples of lithium salts include, $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylates, LiCl, LiBr, LiI, chloroborane lithium, lithium tetraphenylborate, and imides (e.g., $(LiN(C_2F_5SO_2)_2)$). They may be used singly or in combination of two or more of them. The amount of the lithium salt dissolved in the non-aqueous solvent is not particularly limited; it is preferably 0.2 to 2.0 mol/L, and more preferably 0.5 to 1.5 mol/L.

Besides the above, the non-aqueous electrolyte may be a gelled electrolyte or a solid electrolyte.

Examples of the invention are hereinafter described in detail, but the invention is not limited to these Examples.

EXAMPLE 1

A coin-type non-aqueous electrolyte secondary battery as illustrated in FIG. 1 was produced in the following procedure, and evaluated for its high-temperature storage characteristic.

(i) Preparation of Positive Electrode

Lithium acetate powder (24114-00 available from Kanto Chemical Co., Inc.), electrolytic manganese dioxide powder (MNO02PB available from Japan Pure Chemical Co., Ltd.), and nickel acetate powder (NIH03XB available from Japan Pure Chemical Co., Ltd.) were weighed into a molar ratio of Li:Mn:Ni=1:1.6:0.4. They were ground and mixed in a mortar.

The mixture obtained was baked at 350° C. in air for 12 hours, to obtain an active material powder comprising a cation-deficient, spinel-type lithium-containing manganese oxide $LiMn_{1.6}Ni_{0.4}O_{4.2}$. The molar ratio B of Ni to the total of Mn and Ni in the whole active material particles was 0.20. With respect to the composition of the whole active material particles, the quantitative analysis of Li and Mn was made by ICP emission spectroscopy. Also, the quantitative analysis of O was made by infrared spectroscopy.

Next, the elemental analysis of the surface of the obtained active material particles was made by XPS. The analyzer used was XPS-7000 available from Rigaku Corporation. The analysis conditions were: X-ray source Al—Ka, voltage/current 10 kV/10 mA, acceleration voltage 500 V, etching angle 90°, ion current density 160 μA/cm², and etching rate 5 nm/min ($SiO_2$ conversion). After 1 nm etching, the molar ratio A was 0.36.

Also, an X-ray diffraction analysis (XRD) using CuKa radiation as the X-ray source showed no peak attributed to NiO, which is an oxide of the transition metal element M.

The obtained active material powder of lithium-containing manganese oxide, a carbon black conductive material, and a fluorocarbon resin (polytetrafluoroethylene) binder were mixed in a weight ratio of 90:6:4, to obtain a positive electrode mixture. The binder was in the form of an aqueous dispersion. This positive electrode mixture was shaped into a pellet with a diameter of 4.3 mm and a thickness of 1.1 mm by a pressure of 1 ton/cm², to obtain a positive electrode 4. The positive electrode 4 was then dried at 250° C. in air for 10 hours.

(ii) Preparation of Negative Electrode

A 0.5-mm thick lithium metal foil was punched out to a diameter of 4.3 mm, to obtain a negative electrode 5.

(iii) Preparation of Non-Aqueous Electrolyte

A non-aqueous electrolyte was prepared by dissolving $LiN(C_2F_5SO_2)_2$ at a concentration of 1 mol/L in a solvent mixture of propylene carbonate (PC), ethylene carbonate (EC), and dimethoxyethane (DME) in a volume ratio of 3:1:3.

(iv) Production of Coin Battery

A positive electrode can 1 serving as the positive electrode terminal was made of stainless steel with good corrosion resistance. A negative electrode can 2 serving as the negative electrode terminal was also made of the same stainless steel as that of the positive electrode can 1. Pitch was applied onto the face of the positive electrode can 1 in contact with a gasket 3 and the face of the negative electrode can 2 in contact with the gasket 3. The positive electrode 4 was placed on the bottom of the positive electrode can 1. The negative electrode 5 was pressed to the inner face of the negative electrode can 2. A separator 6 made of polyethylene non-woven fabric was placed over the positive electrode 4. After the non-aqueous electrolyte was injected into the positive electrode can 1, the positive electrode can 1 was engaged with the negative electrode can 2 in such a manner that the separator 6 was disposed between the positive electrode 4 and the negative electrode 5. At this time, the gasket 3 made of polypropylene was fitted between the positive electrode can 1 and the negative electrode can 2. In this way, a battery A1 (outer diameter 6.8 mm and thickness 2.1 mm) as illustrated in FIG. 1 was completed.

EXAMPLE 2

A battery A2 was produced in the same manner as in Example 1 except that lithium acetate, electrolytic manganese dioxide, and nickel acetate were mixed in a molar ratio of Li:Mn:Ni=1:1.90:0.10, so that the molar ratio B was changed to 0.05 and the molar ratio A was changed to 0.30.

EXAMPLE 3

A battery A3 was produced in the same manner as in Example 1 except that lithium acetate, electrolytic manganese dioxide, and nickel acetate were mixed in a molar ratio of Li:Mn:Ni=1:1.80:0.20, so that the molar ratio B was changed to 0.10 and the molar ratio A was changed to 0.33.

EXAMPLE 4

A battery A4 was produced in the same manner as in Example 1 except that lithium acetate, electrolytic manganese dioxide, and nickel acetate were mixed in a molar ratio of Li:Mn:Ni=1:1.69:0.31, so that the molar ratio B was changed to 0.15 and the molar ratio A was changed to 0.35.

EXAMPLE 5

A battery A5 was produced in the same manner as in Example 1 except that lithium acetate, electrolytic manganese dioxide, and nickel acetate were mixed in a molar ratio of Li:Mn:Ni=1:1.54:0.46, so that the molar ratio B was changed to 0.23 and the molar ratio A was changed to 0.38.

EXAMPLE 6

A battery A6 was produced in the same manner as in Example 1 except that lithium acetate, electrolytic manganese dioxide, and nickel acetate were mixed in a molar ratio of Li:Mn:Ni=1:1.50:0.50, so that the molar ratio B was changed to 0.25 and the molar ratio A was changed to 0.44.

COMPARATIVE EXAMPLE 1

A battery B1 was produced in the same manner as in Example 1 except that lithium acetate and electrolytic manganese dioxide were mixed in a molar ratio of Li:Mn=1:2.00, and that Ni was not used.

COMPARATIVE EXAMPLE 2

A battery B2 was produced in the same manner as in Example 1 except that lithium acetate, electrolytic manganese dioxide, and nickel acetate were mixed in a molar ratio of Li:Mn:Ni=1:1.98:0.02, so that the molar ratio B was changed to 0.01 and the molar ratio A was changed to 0.12.

COMPARATIVE EXAMPLE 3

A battery B3 was produced in the same manner as in Example 1 except that lithium acetate, electrolytic manganese dioxide, and nickel acetate were mixed in a molar ratio of Li:Mn:Ni=1:1.96:0.04, so that the molar ratio B was changed to 0.02 and the molar ratio A was changed to 0.19.

COMPARATIVE EXAMPLE 4

A battery B4 was produced in the same manner as in Example 1 except that lithium acetate, electrolytic manganese dioxide, and nickel acetate were mixed in a molar ratio of Li:Mn:Ni=1:1.45:0.55, so that the molar ratio B was changed to 0.28 and the molar ratio A was changed to 0.46.

The batteries A1 to A6 and B1 to B4 were subjected to the following evaluation tests.

[Evaluation]

(1) Capacity Check Test

In a constant temperature chamber set to 20° C., a capacity check test was conducted in the following procedure. Each battery was charged at a constant current of 0.1 mA/cm² (current density in the area where the positive electrode and the negative electrode face each other) until the closed circuit voltage reached 3.5 V. It was then discharged at a constant current of 0.1 mA/cm² until the closed circuit voltage reached 2.5 V. At this time, the discharge time was measured to obtain the battery capacity.

(2) Storage Test

Each battery was stored in the constant temperature chamber set to 60° C. for 40 days, and then subjected to a capacity check test in the constant temperature chamber set to 20° C. in the same manner as described above, to obtain the battery capacity after the storage. The capacity retention rate was calculated according to the following formula:

Capacity retention rate (%)=(battery capacity after storage at 60° C.)/(battery capacity before storage at 60° C.)×100

In the formula, "battery capacity before storage at 60° C." refers to the battery capacity obtained in the above test (1)

Table 1 lists the positive electrode active materials prepared in the above Examples. In Table 1, all the lithium-containing manganese oxides $Li_{1+a}Mn_{2-x-a}Ni_xO_{4+y}$ satisfy a=0 and $0.2 \leq y \leq 0.5$. Also, Table 2 shows the results of the above tests.

TABLE 1

| | $Li_{1+a}Mn_{2-x-a}Ni_xO_{4+y}$ | | | | | |
|---|---|---|---|---|---|---|
| | Active material particle surface | | Whole active material particle | | | composition |
| | Ni/Mn | Molar ratio A (Ni/Mn + Ni) | Ni/Mn | Molar ratio B (Ni/Mn + Ni) | A/B | ratio x |
| Example 1 | 0.57 | 0.36 | 0.25 | 0.20 | 1.8 | 0.40 |
| Example 2 | 0.42 | 0.30 | 0.05 | 0.05 | 6.0 | 0.10 |
| Example 3 | 0.50 | 0.33 | 0.11 | 0.10 | 3.3 | 0.20 |
| Example 4 | 0.55 | 0.35 | 0.18 | 0.15 | 2.3 | 0.31 |
| Example 5 | 0.60 | 0.38 | 0.30 | 0.23 | 1.7 | 0.46 |
| Example 6 | 0.78 | 0.44 | 0.33 | 0.25 | 1.8 | 0.50 |
| Comparative Example 4 | 0.85 | 0.46 | 0.38 | 0.28 | 1.6 | 0.55 |
| Comparative Example 1 | 0.00 | 0.00 | 0.00 | 0.00 | — | 0.00 |
| Comparative Example 2 | 0.14 | 0.12 | 0.01 | 0.01 | 12.0 | 0.02 |
| Comparative Example 3 | 0.23 | 0.19 | 0.02 | 0.02 | 9.5 | 0.04 |

TABLE 2

| | Battery No. | Battery capacity (mAh) | Capacity retention rate (%) |
|---|---|---|---|
| Example 1 | A1 | 4.6 | 95 |
| Example 2 | A2 | 4.2 | 91 |
| Example 3 | A3 | 4.5 | 94 |
| Example 4 | A4 | 4.7 | 95 |
| Example 5 | A5 | 4.5 | 95 |
| Example 6 | A6 | 4.0 | 95 |
| Comparative Example 4 | B4 | 3.7 | 95 |
| Comparative Example 1 | B1 | 4.0 | 82 |
| Comparative Example 2 | B2 | 4.0 | 84 |
| Comparative Example 3 | B3 | 4.1 | 86 |

An XRD analysis of positive electrode active materials of Examples 2 to 6 and Comparative Examples 1 to 4 showed no peak attributed to NiO, which was an oxide of the transition metal element M. The batteries B1 to B3 of Comparative Examples 1 to 3 exhibited low capacity retention rates. The battery B4 of Comparative Example 4 exhibited a low battery capacity. Contrary to this, the batteries A1 to A6 of Examples 1 to 6 exhibited higher capacities and higher capacity retention rates than the batteries B1 to B4 of Comparative Examples 1 to 4. In particular, the batteries A4 to A6 of Examples 4 to 6 with molar ratios A of 0.35 or more exhibited a capacity retention rate of 95% as well as high capacities, showing that their high-temperature storage characteristic is excellent.

EXAMPLE 7

An aqueous solution containing lithium acetate and nickel acetate was used instead of lithium acetate and nickel acetate. Manganese dioxide powder was placed into this aqueous solution, which was then stirred, mixed, and dried. The resultant mixture was ground and mixed in a mortar, followed by baking. Except for this, in the same manner as in Example 1, a positive electrode active material was prepared. The molar ratio A was 0.35. An XRD analysis of this positive electrode active material showed no peak attributed to NiO, which was an oxide of the transition metal element M.

Using this positive electrode active material, a battery A7 was produced in the same manner as in Example 1.

EXAMPLE 8

An aqueous solution of lithium hydroxide (24129-00 available from Kanto Chemical Co., Inc.) and nickel hydroxide (28122-01 available from Kanto Chemical Co., Inc.) was used instead of lithium acetate and nickel acetate. Manganese dioxide powder was placed into this aqueous solution, which was then stirred, mixed, and dried. The resultant mixture was ground and mixed in a mortar, followed by baking. Except for this, in the same manner as in Example 1, a positive electrode active material was prepared. The molar ratio A was 0.38. This positive electrode active material was subjected to an XRD analysis. As a result, a peak attributed to NiO was observed around $2\theta=37.3°$ (the largest peak), and the intensity ratio of this peak to the peak around $2\theta=36.40$ attributed to the lithium-containing manganese oxide was 0.23.

Using this positive electrode active material, a battery A8 was produced in the same manner as in Example 1.

COMPARATIVE EXAMPLE 5

A positive electrode active material was prepared in the same manner as in Example 1 except for the use of lithium hydroxide and nickel hydroxide instead of lithium acetate and nickel acetate. The molar ratio A was 0.43. This active material was subjected to an XRD analysis. As a result, a peak attributed to NiO was observed around $2\theta=37.3°$ (the largest peak), and the intensity ratio of this peak to the peak around $2\theta=36.4°$ attributed to the lithium-containing manganese oxide was 0.52.

Using this positive electrode active material, a battery B5 was produced in the same manner as in Example 1.

COMPARATIVE EXAMPLE 6

A positive electrode active material was prepared in the same manner as in Example 1 except that lithium hydroxide and nickel hydroxide were used instead of lithium acetate and nickel acetate and that the baking temperature was changed to 650° C. The molar ratio A was 0.34. This active material was subjected to an XRD analysis. As a result, a peak attributed to NiO was observed around $2\theta=37.3°$ (the largest peak), and the intensity ratio of this peak to the peak around $2\theta=36.4°$ attributed to the lithium-containing manganese oxide was 0.24.

Using this positive electrode active material, a battery B6 was produced in the same manner as in Example 1.

COMPARATIVE EXAMPLE 7

A positive electrode active material was prepared in the same manner as in Example 1 except for the use of manganese acetate (25052-00 available from Kanto Chemical Co., Inc.) instead of electrolytic manganese dioxide. The molar ratio A was 0.24. An XRD analysis of this positive electrode active material showed no peak attributed to NiO, which was an oxide of the transition metal element M.

Using this positive electrode active material, a battery B7 was produced in the same manner as in Example 1.

The batteries A7 and A8 of Examples 7 and 8 and the batteries B5 to B7 of Comparative Examples 5 to 7 were subjected to the same evaluation test as described above. Table 3 shows the test results.

TABLE 3

|  | Mixture of raw materials | | | | | |
| --- | --- | --- | --- | --- | --- | --- |
|  | Li-containing raw material | Ni-containing raw material | Mn-containing raw material | Mixing method | Intensity ratio of NiO Peak | Baking temperature (° C.) |
| Example 1 | Lithium acetate | Nickel acetate | Manganese dioxide | Powder mixing | — | 350 |
| Example 7 | Lithium acetate | Nickel acetate | Manganese dioxide | Mixing in aqueous solution and drying | — | 350 |
| Example 8 | Lithium hydroxide | Nickel hydroxide | Manganese dioxide | Mixing in aqueous solution and drying | 0.23 | 350 |
| Comparative Example 5 | Lithium hydroxide | Nickel hydroxide | Manganese dioxide | Powder mixing | 0.52 | 350 |
| Comparative Example 6 | Lithium hydroxide | Nickel hydroxide | Manganese dioxide | Powder mixing | 0.24 | 650 |
| Comparative Example 7 | Lithium acetate | Nickel acetate | Manganese acetate | Powder mixing | — | 350 |

TABLE 4

| | Battery No. | Active material particle surface Ni/Mn | Molar ratio A (Ni/Mn + Ni) | A/B | Battery capacity (mAh) | Capacity retention rate (%) |
|---|---|---|---|---|---|---|
| Example 1 | A1 | 0.57 | 0.36 | 1.8 | 4.6 | 95 |
| Example 7 | A7 | 0.54 | 0.35 | 1.8 | 4.7 | 96 |
| Example 8 | A8 | 0.62 | 0.38 | 1.9 | 4.5 | 95 |
| Comparative Example 5 | B5 | 0.76 | 0.43 | 2.2 | 4.4 | 89 |
| Comparative Example 6 | B6 | 0.41 | 0.29 | 1.5 | 4.1 | 88 |
| Comparative Example 7 | B7 | 0.31 | 0.24 | 1.2 | 3.9 | 87 |

The battery A7 of Example 7 exhibited a higher capacity retention rate than the battery A1 of Example 1, although it has a lower molar ratio A. This was probably because the process of mixing in aqueous solution and drying facilitated even distribution of the respective elements on the active material particle surface, thereby permitting the formation of an even surface layer.

In the battery B5 of Comparative Example 5 using lithium hydroxide and nickel hydroxide as the raw materials, peaks attributed to NiO were observed in an XRD analysis, and the initial battery capacity and the capacity retention rate after the storage were low. This was probably because insufficient combustion of the hydroxides in the baking resulted in insufficient substitution of Ni and hence the nickel oxide remained in the active material particle surface.

In the battery B6 of Comparative Example 6, by raising the baking temperature to 650° C., the peak intensity ratio of NiO was lowered, but it was confirmed that NiO still remained. Also, since the baking temperature was high, the inward diffusion of Ni proceeded, so that the molar ratio A was insufficient although it was slightly high. This was probably the reason why the capacity retention rate after the storage test became slightly low.

Contrary to this, in the battery A8 of Example 8 using lithium hydroxide and nickel hydroxide, peaks attributed to NiO were observed after the baking, but the process of mixing in aqueous solution and drying permitted the formation of an even surface layer with a substantially high Ni molar ratio on the active material particles of the lithium-containing manganese oxide. Probably for this reason, the battery A8 exhibited a higher high capacity and a higher capacity retention rate than the batteries B5 and B6 of Comparative Examples 5 and 6.

In the case of the battery B7 of Comparative Example 7, due to inward diffusion of Ni, the molar ratio A became low, which resulted in a decrease in initial capacity as well as capacity retention rate. This was probably because the use of manganese acetate lowered the crystallinity and density of the active material particles compared with the use of manganese dioxide.

EXAMPLES 9-14 AND COMPARATIVE EXAMPLES 8-10

Examinations were made on the use of Fe as the transition metal element M for replacing a part of Mn in a lithium-containing manganese oxide.

Positive electrode active materials were prepared in the same manner as in Examples 1 to 6 and Comparative Examples 2 to 4 except for the use of iron acetate in place of nickel acetate. An XRD analysis of these positive electrode active material showed no peak attributed to NiO, which was an oxide of the transition metal element M. Using these positive electrode active materials, batteries A9 to A14 of Examples 9 to 14 and batteries B8 to B10 of Comparative Examples 8 to 10 were produced. The batteries A9 to A14 and B8 to B10 were subjected to the same evaluation test as that described above.

Table 5 lists the positive electrode active materials prepared in the above Examples. In Table 5, all the lithium-containing manganese oxides $Li_{1+a}Mn_{2-x-a}M_xO_{4+y}$ satisfy a=0 and $0.2 \leq y \leq 0.5$. Also, Table 6 shows the test results.

TABLE 5

$Li_{1+a}Mn_{2-x-a}Fe_xO_{4+y}$

| | Active material particle surface | | Whole active material particle | | | Composition |
|---|---|---|---|---|---|---|
| | Fe/Mn | Molar ratio A (Fe/Mn + Fe) | Fe/Mn | Molar ratio B (Fe/Mn + Fe) | A/B | ratio X |
| Example 9 | 0.42 | 0.30 | 0.05 | 0.05 | 6.0 | 0.10 |
| Example 10 | 0.49 | 0.33 | 0.11 | 0.10 | 3.3 | 0.20 |
| Example 11 | 0.53 | 0.35 | 0.18 | 0.15 | 2.3 | 0.31 |
| Example 12 | 0.54 | 0.35 | 0.25 | 0.20 | 1.8 | 0.40 |
| Example 13 | 0.62 | 0.38 | 0.30 | 0.23 | 1.7 | 0.46 |
| Example 14 | 0.77 | 0.44 | 0.33 | 0.25 | 1.8 | 0.50 |
| Comparative Example 10 | 0.83 | 0.45 | 0.38 | 0.28 | 1.6 | 0.55 |
| Comparative Example 1 | 0.00 | 0.00 | 0.00 | 0.00 | — | 0.00 |
| Comparative Example 8 | 0.13 | 0.12 | 0.01 | 0.01 | 12.0 | 0.02 |
| Comparative Example 9 | 0.25 | 0.20 | 0.02 | 0.02 | 10.0 | 0.04 |

TABLE 6

| | Battery No. | Battery capacity (mAh) | Capacity retention rate (%) |
|---|---|---|---|
| Example 9 | A9 | 4.2 | 90 |
| Example 10 | A10 | 4.5 | 93 |

TABLE 6-continued

|  | Battery No. | Battery capacity (mAh) | Capacity retention rate (%) |
|---|---|---|---|
| Example 11 | A11 | 4.6 | 94 |
| Example 12 | A12 | 4.6 | 94 |
| Example 13 | A13 | 4.4 | 95 |
| Example 14 | A14 | 4.0 | 95 |
| Comparative Example 10 | B10 | 3.8 | 95 |
| Comparative Example 1 | B1 | 4.0 | 82 |
| Comparative Example 8 | B8 | 4.0 | 83 |
| Comparative Example 9 | B9 | 4.0 | 85 |

The batteries A9 to A14 of Examples 9 to 14 had capacities equivalent to or higher than those of the batteries B1 and B8 to B10 of Comparative Examples 1 and 8 to 10, and exhibited high capacity retention rates. In particular, the batteries A11 to A14 of Examples 11 to 14 with molar ratios A of 0.35 or more exhibited capacity retention rates of 94% or more, indicating that their high-temperature storage characteristic is excellent. In this way, the use of Fe in place of Ni as the transition metal element M for replacing a part of Mn in a lithium-containing manganese oxide could also produce almost the same results.

EXAMPLE 15

A 0.5-mm thick aluminum foil was punched out to a diameter of 4.3 mm, to obtain an aluminum plate. In fabricating a battery, lithium foil was pressed to one face (separator side) of the aluminum plate. In the presence of electrolyte, the aluminum plate was caused to electrochemically absorb lithium to form a Li—Al alloy (atomic ratio Li:Al=1:1), to obtain the negative electrode 5. A battery A15 was produced in the same manner as in Example 1 except for the use of this negative electrode.

EXAMPLE 16

A negative electrode was prepared in the following procedure.

Silicon powder (38007-13 available from Kanto Chemical Co., Inc.) and titanium powder (TILOP-150 available from Sumitomo Titanium Corporation) were mixed in a molar ratio of 85:15 to obtain a powder mixture. 1.7 kg of this powder mixture was placed into a vibration ball mill (model: FV-20, internal volume: 64 L) available from Chuo Kakohki Industries, Ltd., and 250 kg of 1-inch diameter stainless steel balls were further placed therein. Thereafter, the atmosphere inside the mill was replaced with argon gas, and the powder mixture was ground (mechanical alloying) at an amplitude of 8 mm and a frequency of 1200 rpm for 60 hours, to obtain a Ti—Si alloy powder.

The result of an XRD analysis showed that the Ti—Si alloy contained at least a Si phase and a $TiSi_2$ phase, and the crystallite size was calculated from the peak position, the half width value, and Scherrer Formula. As a result, the Si phase was found to be amorphous, and the crystallite size of the $TiSi_2$ phase was found to be 15 nm. The weight ratio of the Si phase to the $TiSi_2$ phase was 50:50 on the assumption that all the titanium formed $TiSi_2$.

The Ti—Si alloy was collected into a vibration dryer VU30 of Chuo Kakohki Industries with the argon atmosphere being maintained. While it was being stirred due to vibrations, an argon/oxygen mixed gas was intermittently introduced therein in 1 hour in such a manner that the temperature of the alloy material did not exceed 100° C., so that an oxide coating film was formed on the surface of the Ti—Si alloy particles. The particles were then classified with a sieve to obtain a powder of 63 μm or less, which was used as the negative electrode active material.

The Ti—Si alloy serving as the negative electrode active material, a carbon black as a conductive material, and a polyacrylic acid as a binder were mixed as solid contents in a weight ratio of 86:7:7, to obtain a negative electrode mixture. This negative electrode mixture was formed into the shape of a pellet with a diameter of 4 mm and a thickness of 0.3 mm and dried at 190° C. for 12 hours, to obtain a negative electrode pellet.

In fabricating a battery, lithium foil was pressed to one face (separator side) of the negative electrode pellet. In the presence of electrolyte, the negative electrode pellet was caused to electrochemically absorb lithium to form a lithium alloy, to obtain the negative electrode 5.

Using this negative electrode, a battery A16 was produced in the same manner as in Example 1.

EXAMPLE 17

Graphite serving as the negative electrode active material was mixed with carboxyl methyl cellulose and styrene butadiene rubber serving as binders as solid contents in a weight ratio of 100:1:1, to form a negative electrode mixture. Using this negative electrode mixture, a battery A17 was produced in the same manner as in Example 16.

EXAMPLE 18

Silicon powder was prepared as the negative electrode active material in the same manner as in Example 16 except that titanium powder was not used. The crystallite size of the silicon powder was 12 nm. Using this negative electrode active material, a battery A18 was produced in the same manner as in Example 16.

EXAMPLE 19

SiO powder was prepared as the negative electrode active material in the same manner as in Example 16 except for the use of SiO powder in place of silicon and titanium powder. The crystallite size of the SiO was 12 nm. Using this negative electrode active material, a battery A19 was produced in the same manner as in Example 16.

The batteries A15 to A19 were subjected to the same evaluation test as that described above.

Further, they were subjected to a cycle life test as follows. In a constant temperature chamber set to 20° C., each battery was repeatedly charged and discharged at a constant current. The charge conditions were: charge current density 0.4 mA/cm$^2$; and cut-off voltage of charge 3.5 V. The discharge conditions were: discharge current density 0.4 mA/cm$^2$; and cut-off voltage of discharge 2.5 V. In the charge/discharge cycles, the number of cycles at which the discharge capacity dropped less than 50% of the discharge capacity at the $2^{nd}$ cycle was defined as cycle life.

Table 7 shows the test results.

TABLE 7

| | Battery No. | Negative electrode | Battery capacity (mAh) | Capacity retention rate (%) | Cycle life |
|---|---|---|---|---|---|
| Example 15 | A15 | Aluminum plate | 3.3 | 95 | 32 |
| Example 16 | A16 | Ti—Si alloy-containing electrode mixture | 3.2 | 96 | 209 |
| Example 17 | A17 | Graphite-containing electrode mixture | 1.8 | 94 | 64 |
| Example 18 | A18 | Si-containing electrode mixture | 3.1 | 94 | 64 |
| Example 19 | A19 | SiO-containing electrode mixture | 3.0 | 95 | 88 |

The batteries A15 to A19 of Examples 15 to 19 exhibited high capacity retention rates and thus good high-temperature storage characteristic, although their initial battery capacities were lower than those in the case of using lithium metal as the negative electrode. This has confirmed that the use of these negative electrodes can also produce the effect of the invention. The battery A16 of Example 16 using the Ti—Si alloy in the negative electrode provided an excellent cycle life characteristic.

EXAMPLE 20

A positive electrode active material was prepared in the same manner as in Example 1 except that the baking temperature was changed to 250° C. The molar ratio A was 0.38. As a result of an XRD analysis, a peak attributed to NiO was observed around 2θ=37.3° (the largest peak), and the intensity ratio of this peak to the peak around 2θ=36.4° attributed to the lithium-containing manganese oxide was 0.17. Using this positive electrode active material, a battery A20 was produced in the same manner as in Example 1.

EXAMPLE 21

A positive electrode active material was prepared in the same manner as in Example 1 except that the baking temperature was changed to 300° C. The molar ratio A was 0.37. Using this positive electrode active material, a battery A21 was produced in the same manner as in Example 1.

EXAMPLE 22

A positive electrode active material was prepared in the same manner as in Example 1 except that the baking temperature was changed to 400° C. The molar ratio A was 0.36. Using this positive electrode active material, a battery A22 was produced in the same manner as in Example 1.

EXAMPLE 23

A positive electrode active material was prepared in the same manner as in Example 1 except that the baking temperature was changed to 550° C. The molar ratio A was 0.34. Using this positive electrode active material, a battery A23 was produced in the same manner as in Example 1.

EXAMPLE 24

A positive electrode active material was prepared in the same manner as in Example 1 except that the baking temperature was changed to 600° C. The molar ratio A was 0.30. Using this positive electrode active material, a battery A24 was produced in the same manner as in Example 1.

EXAMPLE 25

A positive electrode active material was prepared in the same manner as in Example 5 except that the baking temperature was changed to 600° C. The molar ratio A was 0.32. Using this positive electrode active material, a battery A25 was produced in the same manner as in Example 1.

EXAMPLE 26

A positive electrode active material was prepared in the same manner as in Example 6 except that the baking temperature was changed to 600° C. The molar ratio A was 0.32. Using this positive electrode active material, a battery A26 was produced in the same manner as in Example 1.

COMPARATIVE EXAMPLE 11

A positive electrode active material was prepared in the same manner as in Example 1 except that the baking temperature was changed to 200° C. The molar ratio A was 0.40. As a result of an XRD analysis, a peak attributed to NiO was observed around 2θ=37.3° (the largest peak), and the intensity ratio of this peak to the peak around 2θ=36.4° attributed to the lithium-containing manganese oxide was 0.43. Using this positive electrode active material, a battery B11 was produced in the same manner as in Example 1.

COMPARATIVE EXAMPLE 12

A positive electrode active material was prepared in the same manner as in Example 1 except that the baking temperature was changed to 650° C. The molar ratio A was 0.28. Using this positive electrode active material, a battery B12 was produced in the same manner as in Example 1.

The batteries A20 to A26 of Examples 20 to 26 and the batteries B11 to B12 of Comparative Examples 11 to 12 were subjected to the same evaluation test as that described above. Table 8 shows the test results together with the result of the battery A1 of Example 1.

TABLE 8

| | Battery No. | Baking temperature (° C.) | Intensity ratio of NiO peak | Active material particle surface | | A/B | Battery capacity (mAh) | Capacity retention rate (%) |
|---|---|---|---|---|---|---|---|---|
| | | | | Ni/Mn | Molar ratio A (Ni/Mn + Ni) | | | |
| Example 1 | A1 | 350 | — | 0.57 | 0.36 | 1.8 | 4.6 | 95 |
| Example 20 | A20 | 250 | 0.17 | 0.60 | 0.38 | 1.9 | 4.4 | 93 |

TABLE 8-continued

| | Battery No. | Baking temperature (° C.) | Intensity ratio of NiO peak | Active material particle surface Ni/Mn | Molar ratio A (Ni/Mn + Ni) | A/B | Battery capacity (mAh) | Capacity retention rate (%) |
|---|---|---|---|---|---|---|---|---|
| Example 21 | A21 | 300 | — | 0.58 | 0.37 | 1.8 | 4.5 | 95 |
| Example 22 | A22 | 400 | — | 0.56 | 0.36 | 1.8 | 4.5 | 95 |
| Example 23 | A23 | 550 | — | 0.51 | 0.34 | 1.7 | 4.4 | 95 |
| Example 24 | A24 | 600 | — | 0.43 | 0.30 | 1.5 | 4.3 | 93 |
| Example 25 | A25 | 600 | — | 0.47 | 0.32 | 1.4 | 4.2 | 92 |
| Example 26 | A26 | 600 | — | 0.48 | 0.32 | 1.3 | 4.0 | 91 |
| Comparative Example 11 | B11 | 200 | 0.43 | 0.67 | 0.40 | 2.0 | 3.7 | 89 |
| Comparative Example 12 | B12 | 650 | — | 0.42 | 0.28 | 1.4 | 3.9 | 89 |

An XRD analysis of positive electrode active materials of Examples 21 to 26 and Comparative Example 12 showed no peak attributed to NiO, which was an oxide of the transition metal element M. The batteries A1 and A20 to A26 of Examples 1 and 20 to 26 in which the baking temperature ranges from 250 to 600° C. provided battery capacities of 4 mAh or more and capacity retention rates of 90% or more. The battery B11 of Comparative Example 11 in which the baking temperature is less than 250° C. exhibited a high peak intensity ratio of NiO and a low capacity retention rate, although the molar ratio A was 0.40. Also, in the case of the battery B12 of Comparative Example 12 in which the baking temperature is higher than 600° C., since the inward diffusion of Ni proceeded, the molar ratio A was 0.28 and the capacity retention rate was 89%. It should be noted that the batteries A1 and A21 to 23 of Examples 1 and 21 to 23 in which the baking temperature ranges from 300 to 550° C. exhibited a capacity retention rate of 95%, providing an excellent high-temperature storage characteristic. The batteries of Examples 5 and 6 in which the baking temperature is 350° C. and A/B>1.5 exhibited higher capacity retention rates than the batteries of Examples 25 and 26 in which the baking temperature is 600° C. and A/B<1.5.

In the foregoing Examples, a=0 in the lithium-containing manganese oxides $Li_{1+a}Mn_{2-x-a}M_xO_{4+y}$, but in the following Examples, a≠0.

EXAMPLE 27

A battery A27 was produced in the same manner as in Example 2 except that lithium acetate, electrolytic manganese dioxide, and nickel acetate were mixed in a molar ratio of Li:Mn:Ni=1.15:1.75:0.10.

EXAMPLE 28

A battery A28 was produced in the same manner as in Example 2 except that lithium acetate, electrolytic manganese dioxide, and nickel acetate were mixed in a molar ratio of Li:Mn:Ni=1.33:1.57:0.10.

COMPARATIVE EXAMPLE 13

A battery B13 was produced in the same manner as in Example 2 except that lithium acetate, electrolytic manganese dioxide, and nickel acetate were mixed in a molar ratio of Li:Mn:Ni=0.90:2.00:0.10.

COMPARATIVE EXAMPLE 14

A battery B14 was produced in the same manner as in Example 2 except that lithium acetate, electrolytic manganese dioxide, and nickel acetate were mixed in a molar ratio of Li:Mn:Ni=1.40:1.50:0.10.

The batteries A27 to A28 of Examples 27 to 28 and the batteries B13 to B14 of Comparative Examples 13 to 14 were subjected to the same evaluation test. Table 9 shows the test results together with the result of the battery A2 of Example 2.

TABLE 9

| | Battery No. | Value x | Value a | Active material particle surface Ni/Mn | Molar ratio A (Ni/Mn + Ni) | A/B | Battery capacity (mAh) | Capacity retention rate (%) |
|---|---|---|---|---|---|---|---|---|
| Example 2 | A2 | 0.10 | 0.00 | 0.42 | 0.30 | 6.0 | 4.2 | 91 |
| Example 27 | A27 | 0.10 | 0.15 | 0.44 | 0.31 | 7.9 | 4.4 | 93 |
| Example 28 | A28 | 0.10 | 0.33 | 0.43 | 0.30 | 6.9 | 4.2 | 92 |
| Comparative Example 13 | B13 | 0.10 | −0.10 | 0.38 | 0.28 | 7.8 | 3.9 | 88 |
| Comparative Example 14 | B14 | 0.10 | 0.40 | 0.44 | 0.31 | 6.7 | 3.9 | 92 |

An XRD analysis of positive electrode active materials of Examples 27 to 28 and Comparative Examples 13 to 14 showed no peak attributed to NiO, which was an oxide of the transition metal element M. The batteries A27 and A28 of Examples 27 and 28 having values a of 0.15 and 0.33, respectively, provided high capacities and high capacity retention rates in the same manner as the battery A2 of Example 2 having a value a of 0. However, the batteries B13 and B14 of Comparative Examples 13 and 14 having values a of −0.10 and 0.40, respectively, exhibited low battery capacities. Also, the battery B13 of Comparative Example 13 having a value a of −0.10 exhibited a molar ratio A of less than 0.3 and a low capacity retention rate.

The non-aqueous electrolyte secondary battery of the invention is preferably used as the main power source for electronic devices such as digital still cameras and as the power source for memory back-up.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A positive electrode material for a non-aqueous electrolyte secondary battery, comprising active material particles that comprise a lithium-containing manganese oxide represented by the general formula: $Li_{1+a}Mn_{2-x-a}M_xO_{4+y}$ where M is a transition metal element other than Mn, $0<x\leqq0.5$, $-0.2\leqq y\leqq0.5$, and $0\leqq a\leqq0.33$, wherein the molar ratio A of M to the total of Mn and M in the surface of the active material particles and the molar ratio B of M to the total of Mn and M in the whole active material particles satisfy the relations: $A/B>1.0$ and $A\geqq0.3$, wherein, in an X-ray diffraction analysis using CuKα radiation as an X-ray source, the intensity ratio of the largest peak of peaks attributed to an oxide of the transition metal element M to a peak around $2\theta=36.4°$ is 0.25 or less, and the transition metal element M is at least one selected from the group consisting of Ni, Fe, Ti, Zr, and Cu.

2. The positive electrode material for a non-aqueous electrolyte secondary battery in accordance with claim 1, wherein the molar ratios A and B satisfy the relations: $A/B\geqq1.5$ and $0<B\leqq0.22$.

3. A non-aqueous electrolyte secondary battery comprising the positive electrode material of claim 1.

4. The positive electrode material for a non-aqueous electrolyte secondary battery in accordance with claim 1, wherein the transition metal element M is at least one selected from the group consisting of Ni, Fe, and Ti.

* * * * *